United States Patent

Snell et al.

[15] 3,676,443
[45] July 11, 1972

[54] CERTAIN 2-FORMAMIDO-4-HYDROXYPYRIMIDINES

[72] Inventors: Brian Kenneth Snell, Ruscombe; Nigel Douglas Bishop, Winnersh, both of England

[73] Assignee: Imperial Chemical Industries Limited, London, England

[22] Filed: May 18, 1970

[21] Appl. No.: 38,543

[30] Foreign Application Priority Data

May 28, 1969  Great Britain......................26,920/69

[52] U.S. Cl...................260/256.4 C, 260/256.5 R, 424/251
[51] Int. Cl. .......................................................C07d 51/38
[58] Field of Search .........................................260/256.4 C

[56] References Cited

OTHER PUBLICATIONS

Hull et al., Chem. Abstracts, 41:3467–9 (1947).

Primary Examiner—Alex Mazel
Assistant Examiner—R. J. Gallagher
Attorney—Cushman, Darby & Cushman

[57] ABSTRACT

Pyrimidine derivatives of formula:

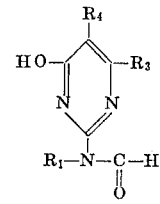

wherein $R_1$ represents an atom of hydrogen or an alkyl radical and $R_3$ and $R_4$ represent atoms of hydrogen or halogen or alkyl radicals; and salts, ethers and esters thereof; and compositions containing them, are pesticidal.

3 Claims, No Drawings

CERTAIN 2-FORMAMIDO-4-HYDROXYPYRIMIDINES

This invention relates to pyrimidine derivatives, to processes for making them, to pesticidal compositions containing them and to methods for combating plant fungal diseases.

According to the invention we provide pyrimidine derivatives of the formula:

[Structure: pyrimidine with $R_4$ and $R_3$ substituents, OH group, and N($R_1$)CHO group]

wherein $R_1$ represents an atom of hydrogen or an alkyl radical; and $R_3$ and $R_4$, which may be the same or different, represent hydrogen or halogen atoms or alkyl radicals; and salts, ethers and esters thereof.

Preferred compounds according to the invention include those having the formula:

[Structure: pyrimidine with $R_4$, $R_3$, OH and N($R_1$)CHO substituents]

wherein $R_1$ represents an atom of hydrogen or an alkyl radical containing from one to 6 carbon atoms; $R_3$ represents a hydrogen atom or an alkyl radical containing from one to 6 carbon atoms; and $R_4$ represents an atom of halogen or an alkyl radical containing from one to 6 carbon atoms; and salts, ethers and esters thereof.

Particularly preferred compounds according to the invention are those having the formula:

[Structure: pyrimidine with $R_4$, $R_3$, OH and N($R_1$)CHO substituents]

wherein $R_1$ represents an atom of hydrogen or a methyl or ethyl radical; $R_3$ represents a methyl radical; and $R_4$ represents a chlorine atom or a n-butyl radical; and salts, ethers and esters thereof.

Specific compounds according to the invention are those listed in Table I below together with a melting point for each compound given in degrees centigrade.

TABLE I

| Compound Number | Structural formula | Melting point, °C. |
|---|---|---|
| 1 | [Structure: 5-methyl-6-n-butyl-4-hydroxy-2-formamidopyrimidine, R=H] | 198–202 |
| 2 | [Structure: 5-methyl-6-n-butyl-4-hydroxy-2-(N-methyl)formamidopyrimidine] | 171–173 |
| 3 | [Structure: 5-methyl-6-n-butyl-4-hydroxy-2-(N-ethyl)formamidopyrimidine] | 148–149 |
| 4 | [Structure: 5-methyl-6-chloro-4-hydroxy-2-(N-methyl)formamidopyrimidine] | 225 |

An especially useful compound fungicidally is the compound No. 2 in Table I above.

The active ingredients of the fungicidal compositions of the invention are capable of forming salts with metals and the invention therefore includes, as stated above, fungicidal compositions wherein the active ingredient is in the form of a salt. Preferred salts are alkali metal salts.

The active ingredients of the fungicidal compositions of this invention may also be in the form of ethers, having the general formula:

[Structure: pyrimidine with $R_4$, $R_3$, O–R and N($R_1$)CHO substituents]

wherein $R_1$, $R_3$ and $R_4$ have any of the meanings as hereinbefore defined, and R represents a hydrocarbyl group, preferably an alkyl or substituted alkyl group, or an aralkyl group; or in the form of esters having the formula:

[Structure: pyrimidine with $R_4$, $R_3$, O–X–$R_2$ and N($R_1$)CHO substituents]

wherein $R_1$, $R_3$ and $R_4$ have any of the meanings as hereinbefore defined, and $R_2$ represents an atom of hydrogen, or a hydrocarbyl or hydrocarbyloxy group, preferably an alkyl, or substituted alkyl group, or an aryl or substituted aryl group or an alkoxy group, and X represents a carbonyl, thiocarbonyl or sulphonyl group.

The invention therefore includes, as stated above fungicidal compositions wherein the active ingredient is in the form of an ether or an ester.

The pyrimidine derivatives are, for convenience, referred to throughout the present specification as having the formula:

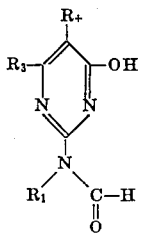

wherein $R_1$, $R_3$ and $R_4$ have any of the meanings hereinbefore defined. The compounds, however, also exist with tautomeric structures of the following form:

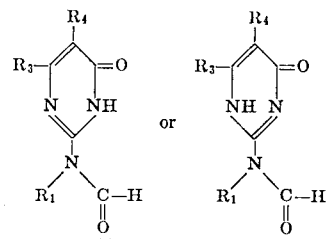

and the present invention is to be understood as including the tautomeric forms of such compounds.

In this specification the numbering of the pyrimidine ring is as follows:

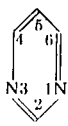

It may be noted that the 4- and 6- positions are equivalent. The invention also provides a process for preparing hydroxy pyrimidines of the formula:

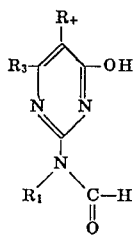

wherein $R_1$, $R_3$ and $R_4$ are as hereinbefore defined, by formylation of the corresponding 2-aminopyrimidines. A suitable formylation agent is, for example, formic-acetic anhydride. The reaction may optionally be carried out in the presence of a solvent or diluent and at elevated temperatures.

A preferred process is one wherein no solvent or diluent other than the mixture of acetic anhydride and formic acid used to produce the formic-acetic anhydride in situ is used, and wherein the temperature is maintained in the range from 5° to 30° C. The reactions are usually complete in a period of from 30 minutes to 50 hours.

Various other methods well-known to those skilled in the art may be used to prepare the fungicidally-active pyrimidine derivatives and in so far as these methods are pertinent to the preparation of new compounds they form part of the present invention. Pyrimidine derivatives useful as starting materials for the preparation of a compound of the present invention have been described in British Patent, Ser. No. 1,182,584.

The pyrimidine derivatives, where appropriate can be readily converted into the corresponding salts by usual methods, for example the corresponding sodium salt can be prepared by treating a pyrimidine derivative with sodium hydroxide. The ethers and esters of the pyrimidine derivatives may be obtained by the methods well known to those skilled in the art for the preparation of such compounds, for example ethers may be obtained by the reaction of an alkali metal salt of the pyrimidine derivative with a haloalkyl compound, and esters may be obtained by reaction of the pyrimidine derivative with an acyl halide or sulphonyl halide, optionally in the presence of a base.

The invention further includes fungicidal compositions comprising as an active ingredient a compound as defined above.

The fungicidal compositions of the invention possess activity against a wide variety of fungal diseases including the following specific diseases:

*Sphaerotheca fuliginea* (powdery mildew) on cucumber
*Erysiphe graminis* (powdery mildew) on wheat and barley
*Phytophthora infestans* (late blight) on tomato
*Puccinia recondita* (rust) on wheat
*Podosphaera leucotricha* (powdery mildew) on apple
*Uncinula necator* (powdery mildew) on vine
*Plasmopara viticola* (downy mildew) on vine
*Piricularia oryzae* (blast) on rice
*Venturia inaequalis* (scab) on apple A particularly useful feature of the activity of some of the invention compounds is their ability to act as systemic pesticides, that is to say, their ability to move in a plant to combat an infection thereon remote from a site of initial application of a compound. Thus a compound of the invention, or a composition containing the same, may be applied to the soil surrounding the roots of a plant and taken up by the plant through its roots to combat an infection on the plant.

The fungicidal compositions of the invention can be used to combat plant pathogens in a number of ways. Thus they can be applied to the foliage of an infected plant, to seed or to the soil in which plants are growing or to be planted.

In a further aspect the invention includes a method for the combating of undesired fungal infections in growing plants which comprises applying to the locus of the plant a pyrimidine derivative as hereinbefore defined.

In yet a further aspect the invention includes a method for treating agricultural soil comprising applying to the soil a pyrimidine derivative as hereinbefore defined.

The invention includes therefore a method of combating plant pathogens in which a plant susceptible to such pathogens, or seed thereof, is treated with a pyrimidine derivative as hereinbefore defined.

The compositions may be used for agricultural and horticultural purposes and the type of composition used in any instance will depend upon the particular purpose for which it is to be used.

The compositions may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, Fuller's earth, gypsum, Hewitt's earth, diatomaceous earth and China clay. Compositions for dressing seed, for example, may comprise an agent assisting the adhesion of the composition to the seed, for example a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally solutions, aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropylnaphthalene sulphonic acids. Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long-chain fatty acids and hexitol anhydrides, the condensation products of the said partial esters with ethylene oxide, and the lecithins. Suitable suspending agents are, for example hydrophilic colloids, for example polyvinyl- pyrrolidone and sodium carboxymethylcellulose, and the vegetable gums, for example gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules, containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain on treated surfaces, the different compositions can be better adapted for the various uses for which they are intended.

The compounds may also be conveniently formulated by admixing them with fertilizers. A preferred composition of this type comprises granules of fertilizer material incorporating, for example coated with, an invention compound. The fertilizer material may, for example, comprise nitrogen or phosphate- containing substances.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85 percent by weight of the active ingredient or ingredients and generally from 25–60 percent by weight of the active ingredient or ingredients. When diluted to form aqueous preparations, such preparations may contain varying amounts of the active ingredient or ingredients depending upon the purpose for which they are to be used, but an aqueous preparation containing between 0.001 percent and 1.0 percent by weight of active ingredient or ingredients may be used.

It is to be understood that the compositions of this invention may comprise, in addition to an invention compound, one or more other compounds having biological activity.

The invention is illustrated by the following examples in which all references to percentage amounts of constituents are by weight and are based on the weight of the composition as a whole.

EXAMPLE 1

This example illustrates the preparation of the formic-acetic anhydride reagent used in the following examples in preparing the invention compounds.

Anhydrous formic acid (125 cc.) was added slowly to acetic anhydride (250 cc.) keeping the temperature below 5° C by external cooling. The mixture was then heated to 50° C and kept at that temperature for 15 minutes after which it was cooled down to 5° C and stored at a temperature not exceeding 5° C in a tightly stoppered bottle until required for use.

EXAMPLE 2

This example illustrates the preparation of 5-n-butyl-4-methyl-12-methylformamido-6-hydroxypyrimidine (Compound No. 2, Table I), having the formula:

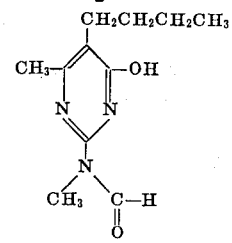

5-n-Butyl-4-methyl-2-methylamino-6-hydroxypyrimidine (5.5 g.) was added in small portions to formic-acetic anhydride reagent (75 cc.; prepared as described in Example 1 hereinabove), and when the addition was completed, the mixture was allowed to stand at room temperature for 16 hours, after which it was warmed at 75° C for 2.5 hours. Evaporation of the volatile portion of the mixture under reduced pressure, and recrystallization of the residual solid from ethanol yielded 5-n-butyl-4-methyl-2-methylformamido-6-hydroxypyrimidine, having a melting point of 171°–3° C. Analysis: Found C, 59.20; H, 7.62; N, 18.8: $C_7H_{11}N_3O_2$ requires C, 59.2; H, 8.29; N, 18.9 percent.

EXAMPLE 3

This example illustrates the preparation of 5-chloro-4-hydroxy-2-methylformamido-6-methylpyrimidine (Compound no. 4, Table I), having the formula:

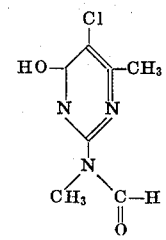

5chloro-4-hydroxy-2-methylamino-6-methylpyrimidine (1.8 g.) was added at 16° C to formic-acetic anhydride reagent (15 cc.) prepared as in Example 1. The pyrimidine derivative dissolved in a few seconds. After about 3 minutes a dense white precipitate was formed, and this was collected by filtration after about 1 hours, and washed with a little chilled ethyl acetate to yield 5-chloro-4-hydroxy-2-methylformamido-6-methylpyrimidine having a melting point of 225° (decomposition). Analysis: Found C, 41.8; H, 4.23; N, 20.8: $C_7H_8ClN_3O_2$ requires C, 41.70; H, 3.90; N, 20.9 percent.

EXAMPLE 4

This example illustrates the preparation of 5-n-butyl-2-formamido-4-hydroxy-6-methylpyrimidine (Compound no. 1, Table I), having the formula:

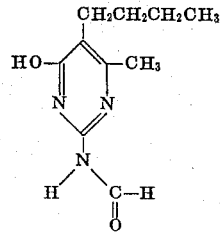

5-n-butyl-2-amino-4-hydroxy-6-methylpyrimidine (5.0 g.) was added at 10° C to formic-acetic anhydride reagent (45 cc., prepared by the procedure described in Example 1). After standing for 4 days at the ambient temperature the mixture was diluted with water (250 cc.) and extracted twice with methylene chloride (100 cc.). The extracts were combined, washed with cold water, and dried over anhydrous sodium sulphate. After the solvent had been removed by evaporation under reduced pressure the residual solid was recrystallized twice from ethanol to yield 5-n-butyl-2-formamido-4-hydroxy-6-methylpyrimidine, as a colorless crystalline solid having a melting point of 198°–202° C (decomposition). Analysis: Found C, 57.1; H, 8.12; N, 20.2: $C_6H_9N_3O_2$ requires C, 57.41; H, 7.18; N, 20.1 percent.

EXAMPLE 5

This example illustrates the preparation of 5-n-butyl-2-ethylformamido-4-hydroxy-6-methylpyrimidine (Compound no. 3, Table I), having the formula:

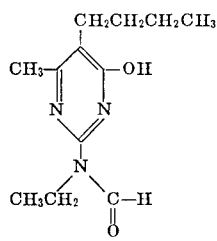

5-n-butyl-2-ethylamino-4-hydroxy-6-methylpyrimidine (5.0 g.) was dissolved in formic-acetic anhydride reagent (45 cc.; prepared by the procedure described in Example 1) at 5° C. After a few minutes a dense white precipitate was formed and this was collected by filtration after a further 1 hour. Recrystallization from ethanol yielded 5-n-butyl-2-ethylformamido-4-hydroxy-6-methylpyrimidine as a white crystalline solid, having a melting point of 148°–149° C. Analysis: Found C, 60.4; H, 7.92; N, 17.9: $C_8H_{13}N_3O_2$ requires C, 60.79; H, 8.02; N, 17.72 percent.

EXAMPLE 6

This example illustrates an atomisable fluid comprising a mixture consisting of 25 percent by weight of the product of Example 2 and 75 percent by weight of xylene.

EXAMPLE 7

This example illustrates a dusting powder which may be applied directly to plants or other surfaces and comprises 1 percent by weight of the product of Example 4 and 99 percent by weight of talc.

EXAMPLE 8

Twenty-five parts by weight of the product described in Example 2, 65 parts by weight of xylene, and 10 parts of an alkyl aryl polyether alcohol ("Triton" X–100; "Triton" is a Trade Mark) were mixed in a suitable mixer. There was thus obtained an emulsion concentrate which can be mixed with water to produce an emulsion suitable for use in agricultural applications.

EXAMPLE 9

Five parts by weight of the product described in Example 5, were thoroughly mixed in a suitable mixer with 95 parts by weight of talc. There was thus obtained a dusting powder.

EXAMPLE 10

Ten parts by weight of the product described in Example 2, 10 parts of an ethylene oxide-octylphenol condensate ("Lissapol" NX; "Lissapol" is a Trade Mark) and 80 parts by weight of diacetone alcohol were thoroughly mixed. There was thus obtained a concentrate which, on mixing with water, gave an aqueous dispersion suitable for application as a spray in the control of fungal pests.

EXAMPLE 11

This example illustrates a concentrated liquid formulation in the form of an emulsion. The ingredients listed below were mixed together in the stated proportions and the whole stirred until the constituents were dispersed.

|  | % wt. |
|---|---|
| Product of Example 4 | 20% |
| 'LUBROL' L ('Lubrol' is a Trade Mark) | 17% |
| Calcium dodecylbenzenesulphonate | 3% |
| Ethylene dichloride | 45% |
| 'AROMASOL' H ('Aromasol' is a Trade Mark) | 15% |
| Total: | 100% |

EXAMPLE 12

The ingredients listed below were ground together in the proportions stated to produce a powered mixture readily dispersible in liquids.

|  | % wt. |
|---|---|
| Product of Example 2 | 50% |
| Dispersol T ("Dispersol" is a Trade Mark) | 5% |
| China clay | 45% |
| Total: | 100% |

EXAMPLE 13

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | % wt. |
|---|---|
| Product of Example 2 | 50% |
| Dispersol T | 12.5% |
| Calcium lignosulphonate | 5% |
| Sodium dodecylbenzenesulphonate | 12.5% |
| Sodium acetate | 20% |
| Total: | 100% |

EXAMPLE 14

A composition suitable for use as a seed-dressing was prepared by mixing all three of the ingredients set out below in the proportions stated.

| | % wt. |
|---|---|
| Product of Example 4 | 80% |
| Mineral oil | 2% |
| China clay | 18% |
| Total: | 100% |

EXAMPLE 15

A granular composition was prepared by dissolving the active ingredient in a solvent, spraying the solution obtained onto the granules of pumice and allowing the solvent to evaporate.

| | % wt. |
|---|---|
| Product of Example 5 | 5% |
| Pumice Granules | 95% |
| Total: 100% | |

EXAMPLE 16

An aqueous dispersion formulation was prepared by mixing and grinding the ingredients recited below in the proportions stated.

| | % wt. |
|---|---|
| Product of Example 2 | 40% |
| Calcium lignosulphonate | 10% |
| Water | 50% |
| Total: | 100% |

The following constitutes an explanation of the compositions or substances represented by the various Trade Marks and Trade Names referred to in the foregoing examples.

| | |
|---|---|
| "LUBROL" L | is a condensate of 1 mole of nonyl phenol with 13 molar proportions of ethylene oxide. |
| "AROMASOL" H | is a solvent mixture of alkylbenzenes. |
| "DISPERSOL" T | is a mixture of sodium sulphate and a condensate of formaldehyde with the sodium salt of naphthalene sulphonic acid. |
| "LISSAPOL" NX | is a condensate of 1 mole of nonyl phenol with 8 moles of ethylene oxide. |

EXAMPLE 17

Compositions according to the invention were made up in the following manner and tested in different ways against various foliar-borne fungal diseases. The procedure adopted for each test is described below. In the tests, both a protectant and an eradicant test were carried out. In the protectant test, the plants were either sprayed so that the leaves were wetted, or the surrounding soil drenched with a solution or suspension containing 125, 25 or 5 parts per million of the active compound which may also contain 0.1 percent of a wetting agent. After a lapse of time, depending on the disease, the plants were inoculated with the disease, the extent of which was assessed visually at the end of the test. In the eradicant test, the plants were inoculated with the disease and then, after a number of days depending on the disease, the leaves were wetted by spraying with a solution or suspension containing 125, 25 or 5 parts per million of the active compound and optionally 0.1 percent of a wetting agent. The results are expressed in the table below as a grading giving the percentage amount of disease:

| Grading | Percentage amount of disease |
|---|---|
| 0 | 61–100 |
| 1 | 26–60 |
| 2 | 6–25 |
| 3 | 0–5 |

The table of results (Table 2) follows the detailed procedure for the various tests.

A. Spray-applied Protectant Test

A suspension or solution containing the active compound was sprayed directly onto the leaves of plants, a wetting agent being used when the plant was wheat, barley or rice. After a suitable period of time (time interval A) depending upon the particular plant, the plant was inoculated with the fungus under test and after a further suitable period of time (time interval B), again depending upon the particular plant and fungus, the extent of infection was assessed visually.

B. Drench-applied Protectant Test

A suspension or solution containing the active compound was applied to the soil surrounding the plant under test, and the plant was inoculated with the fungus and the extent of infection was assessed visually.

C. Spray-applied Eradicant Test

The plants are inoculated with the fungus under test, and 24 hours later the liquid preparation is sprayed onto the leaves of the plants as described under A above. After a further period of time (time interval C), again depending upon the particular plant and fungus, the extent of infection is assessed visually.

| Disease and plant | Time interval A and B (days) | Time interval C (days) |
|---|---|---|
| Puccinia recondita (wheat) | 10 | — |
| Phytophthora infestans (tomato) | 3 | — |
| Sphaerotheca fuliginea (cucumber) | 7 | 6 |
| Erysiphe graminis (wheat) | 7 | 6 |
| Erysiphe graminis (barley) | 7 | 6 |
| Podosphaera leucotricha (apple) | 10 | 9 |
| Uncinula necator (vine) | 10 | 9 |
| Plasmopara viticola (vine) | 7 | — |
| Piricularia oryzae (rice) | 7 | 6 |
| Venturia inaequalis (apple) | 21 | 20 |

An aqueous solution or suspension containing 500 parts per million (p.p.m.) of the compound under test and suitable, after dilution, either for drenching the soil surrounding growing plants, or for spraying onto the leaves of plants (except wheat, barley and rice plants) is obtained by adding water to a solution of the compound (200 mg.) in acetone (1 ml.) until the total volume of the mixture is 400 ml. An aqueous solution or suspension suitable for spraying onto the leaves of wheat, barley and rice plants is prepared similarly, but instead of water, a 0.1 percent volume/volume aqueous solution of the polyoxyethylenesorbitan monolaurate wetting agent, "Tween" 20, is used ("Tween" is a Trade Mark). These solutions were appropriately diluted with water to provide the test solutions used containing 125, 25 and 5 parts per million, respectively, of the invention compound.

EXAMPLE 18

This example illustrates the superior performance of a compound of the invention (compound no. 1, Table I having the formula IV below) in comparison with related pyrimidine compounds which show activity as fungicides, is the control of late blight (*Phytophthora infestans*) which is an economically important disease of potato and tomato crops.

Pyrimidine derivatives disclosed in British Pat. specification, Ser. No. 1,182,584 as having fungicidal activity include 5-n-butyl-2-dimethylamino-4-hydroxy-6-methylpyrimidine, also known by the British Standards common name of "dimethirimol," and 5-n-butyl-2-ethylamino-4-hydroxy-6-methylpyrimidine, also known by the British Standards common name of "ethirimol." These compounds have the formulae shown below as formula I and formula II respectively. The fungicidally-active pyrimidine derivative 5-n-butyl-2-methylamino-4-hydroxy-6-methylpyrimidine has the formula III below.

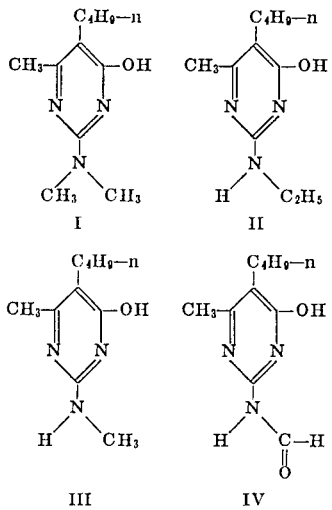

aqueous compositions were made up and tested against *Phytophthora infestans* in the spray-applied protectant (P.S.A.) test and the drench-applied protectant (P.R.D.) test in the manner described in Example 17 above.

The results, graded as in Example 17, and given in Table 3 below, show that a compound of the invention is remarkably superior to related fungicidally-active pyrimidine derivatives in the control of late blight.

TABLE 3

| Compound | Test | Concentration of active ingredient (ppm) | | | |
|---|---|---|---|---|---|
| | | 500 | 125 | 25 | 5 |
| Compound No. 1 | PSA | 3 | 2 | 0 | — |
| (Table I) IV | PRD | 3 | 3 | 2 | 1 |
| dimethirimol | PSA | 2 | — | 0 | — |
| (I) | PRD | P | P | 0 | — |
| ethirimol | PSA | 2 | 0 | — | — |
| (II) | PRD | 1 | 0 | — | — |
| 5-n-butyl-2-methyl-amino-4-hydroxy-6-methylpyrimidine | PSA | 0 | — | — | — |
| (III) | PRD | 0 | — | — | — |

P = phytotoxic effects on plants
— = not tested

We claim:
1. A pyrimidine derivative selected from compounds having the formula:

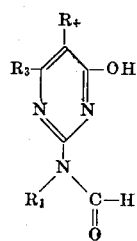

wherein $R_1$ represents an atom of hydrogen or an alkyl radical containing from one to six carbon atoms; $R_3$ represents a hydrogen atom or an alkyl radical containing from one to six carbon atoms; $R_3$ represents a hydrogen atom or an alkyl radical containing from one to six carbon atoms; and $R_4$ represents an atom of halogen, or an alkyl radical containing from one to six carbon atoms; and the alkali metal salts thereof.

2. Pyrimidine derivatives according to claim 1 and wherein $R_1$ represents an atom of hydrogen or a methyl or ethyl radical; $R_3$ represents a methyl radical; and $R_4$ represents an atom of chlorine or an n-butyl radical; and the alkali metal thereof.

3. Pyrimidine derivatives according to claim 2 and having the formulae:

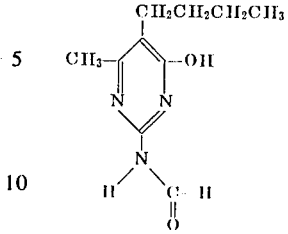 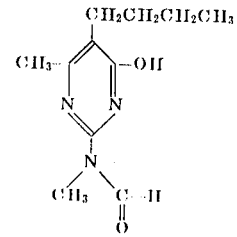

and

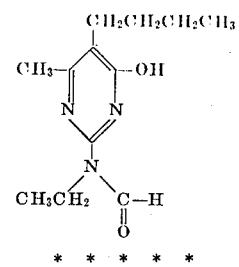

* * * * *